United States Patent [19]

Suk

[11] 4,450,253

[45] May 22, 1984

[54] PROPELLANT-ACTIVE CARRIER SYSTEM FOR WATER-BASED PAINTS

[75] Inventor: Albert Suk, Richmond Hill, Canada

[73] Assignee: CCL Industries Inc., Willowdale, Canada

[21] Appl. No.: 441,278

[22] Filed: Nov. 12, 1982

Related U.S. Application Data

[63] Continuation-in-part of Ser. No. 237,189, Mar. 3, 1981, which is a continuation-in-part of Ser. No. 192,454, Sep. 30, 1980, abandoned, which is a continuation-in-part of Ser. No. 97,152, Nov. 23, 1979, Pat. No. 4,265,797, which is a continuation-in-part of Ser. No. 968,277, Dec. 11, 1978, abandoned.

[51] Int. Cl.$^3$ .................................................. C08K 5/06
[52] U.S. Cl. .................................................. 524/378
[58] Field of Search ........................................ 524/378

[56] References Cited

U.S. PATENT DOCUMENTS 3,207,386  9/1965  Presant .................................. 222/394
3,761,433  9/1973  High ..................................... 524/378

FOREIGN PATENT DOCUMENTS 54-23640  2/1979  Japan .

*Primary Examiner*—Paul R. Michl
*Attorney, Agent, or Firm*—Sim & McBurney

[57] ABSTRACT

A single phase propellant solvent solution comprising dimethyl ether, water, water-soluble polar organic solvents, preferably mixtures of aliphatic alcohol and water-soluble polar organic slow drying coalescing solvent, is used to provide non-flammable aerosol water-based paint compositions. Water-solubilized oil-modified film-forming polymers are dissolved in the propellant-solvent solution and are readily dispersed from an aerosol container onto a substrate surface to form a water-resistant and durable film thereon upon air drying.

15 Claims, No Drawings

PROPELLANT-ACTIVE CARRIER SYSTEM FOR WATER-BASED PAINTS

REFERENCE TO RELATED APPLICATIONS

This application is a continuation-in-part of copending U.S. patent application Ser. No. 237,189 filed Mar. 3, 1981, which is a continuation-in-part of U.S. patent application Ser. No. 192,454 filed Sept. 30, 1980 (now abandoned), which is a continuation-in-part of U.S. patent application Ser. No. 97,152 filed Nov. 23, 1979 (Now U.S. Pat. No. 4,265,797), which is a continuation-in-part of U.S. patent application Ser. No. 968,277 filed Dec. 11, 1978 (now abandoned).

FIELD OF INVENTION

The present invention relates to novel water-based aerosol paint compositions.

BACKGROUND TO THE INVENTION

Aerosol paint compositions are well known but have used volatile organic solvents as the carrier and propellant for the film-forming polymer. Toxicity and flammability problems arise from the use of such organic solvents and governmental regulatory authorities are moving towards severe restrictions on the use of organic solvents in such compositions.

There is, therefore, a need to provide a non-flammable aerosol-based paint composition which is also non-toxic and at the same time able to provide a satisfactory paint film on a substrate surface. The applicant is aware of one prior attempt to meet this need and this prior art attempt is described in Japanese patent publication No. 23640/1979 published Feb. 22, 1979.

As set forth therein, an aqueous aerosol coating composition of low flammability and toxicity is provided. Water is used as the resin solvent, alone or in conjunction with other solvents, to form a stock solution containing 5 to 20 wt.% of resin. The resin is formed by copolymerizing four essential monomers in critical proportions, predominating in acrylic or methacrylic acid esters, followed by partial neutralization with ammonia and/or an amine.

The stock solution is incorporated into an aerosol container for propulsion therefrom using any convenient propellant. Proportions of stock solution to propellant are disclosed to be 70 to 30 wt.% propellant and 30 to 70 wt.% stock solution. The Examples of this prior art disclose the use of mixtures of fluorocarbons and dimethyl ether as the propellants, which produces a two-phase liquid system, in view of the hydrophobicity of the fluorocarbon. Two phase systems introduce problems with dispersing uniform quantities of active component, such as is essential with paint formulations.

It is further disclosed in this prior art that the formulations described in the Examples have residual flammability, although decreased as compared to volatile organic solvent-based systems. The problem of flammability, therefore, has not been overcome by this prior art.

The prior art formulation uses a very specific acrylic resin in the paint composition. Attempts by the applicant to reproduce this resin following the procedures outlined in the Examples thereof have been unsuccessful. As described in the prior art, the resin is chemically an unmodified acrylic resin and, as such, is moisture sensitive when formed as a film.

The prior art of this Japanese patent publication, while achieving some improvement over the organic solvent-based aerosol paint compositions, nevertheless, has not provided a non-flammable aerosol paint composition which may be readily sprayed onto a substrate surface to form a durable paint film thereon.

The Japanese patent publication discloses dimethyl ether as a possible propellant component for the stock solution, but indicates no preference thereto, nor any reason why this material should be selected as compared to other propellants. Indeed, as already noted, in the preferred embodiments of the prior disclosure, namely the Examples, a combination of dimethyl ether and fluorocarbons is used.

It has also been previously suggested elsewhere to use dimethyl ether as a propellant. U.S. Pat. No. 1,800,156 discloses the use of dimethyl ether alone as the propellant for a large variety of materials and paints are mentioned. U.S. Pat. No. 3,207,386 discloses the utilization of a combination of dimethyl ether and water as a propellant for a wide variety of products including paints, the proportions being chosen to provide a homogeneous solution of the dimethyl ether and water as the propellant and this restriction results in a composition consisting of 5 to 35% by weight of dimethyl ether and 95 to 65% by weight of water. No other solvent or propellant components are used in this prior art composition.

SUMMARY OF INVENTION

It has now been surprisingly found that an aerosol water-based paint composition suitable for spray application to a substrate and air drying to a continuous durable film thereon may be provided by a unique combination of components in critical proportions.

The composition provided in accordance with the present invention compises:

(a) about 6 to about 25 wt.% of at least one film-forming polymer which is a drying oil-modified ester polymer which is rendered water soluble by neutralization with a volatile base, usually ammonia or an amine, and which is capable of air drying to a water-resistant coating film upon volatilization of the ammonia or amine after spraying the polymer onto a substrate surface, (b) about 20 to about 60 wt.% of dimethyl ether, (c) about 20 to about 40 wt.% of water, (d) about 0.1 to about 30 wt. % of at least one water-soluble polar organic solvent, (e) 0 to about 3 wt. % of at least one surfactant, (f) 0 to about 15 wt. % of at least one pigment, (g) 0 to about 1 wt. % of at least one pH stabilizer, (h) 0 to about 2 wt. % of at least one antifoam agent, (i) 0 to about 2 wt. % of at least one plasticizer, and (j) 0 to about 0.5 wt. % of at least one drier for the film-forming polymer, The dimethyl ether, water and at least one polar organic solvent are present in proportions to provide a single liquid phase propellant-active carrier solution having a pH of about 7.2 to about 10 and in which the film-forming polymer is dissolved and the remainder of the components of the composition are dissolved or suspended.

In a preferred aspect of the invention, the at least one polar organic solvent comprises at least one aliphatic monohydric alcohol and at least one polar organic coalescing solvent. Accordingly, in a preferred embodiment of the invention, there is provided an aerosol water-based paint composition suitable for spray application to a substrate surface and air drying to a continuous film thereon, comprising:

(a) about 6 to about 25 wt. % of at least one film-forming polymer which is a drying oil-modified ester polymer which is rendered water soluble by neutralization with ammonia or an amine and which is capable of air drying to a water-resistant coating film upon volatilization of the ammonia or amine after spraying the polymer onto a substrate surface, (b) about 20 to about 60 wt. % of dimethyl ether, (c) about 20 to about 40 wt. % of water, (d) about 1 to about 20 wt. % of at least one aliphatic monohydric alcohol of the formula R-OH wherein R is an unsubstituted straight or branched chain alkyl group containing from 1 to 6 carbon atoms, (e) about 1 to about 10 wt. % of at least one water-soluble polar organic coalescing solvent, (f) 0 to about 3 wt. % of at least one surfactant, (g) 0 to about 15 wt. % of at least one pigment, (h) 0 to about 1 wt. % of at least one pH stabilizer, (i) 0 to about 2 wt. % of at least one antifoam agent, (j) 0 to about 2 wt. % of at least one plasticizer, and (k) 0 to about 0.5 wt. % of at least one drier for the film-forming polymer.

The dimethyl ether, water, monohydric alcohol and coalescing solvent are present in proportions to provide a single liquid phase propellant-active carrier solution having a pH of about 7.2 to about 10 and in which the film-forming polymer is dissolved and the remainder of the components of the composition are dissolved or suspended.

The present invention, therefore, provides a critical combination of proportions of dimethyl ether, water and at least one water-soluble organic solvent preferably at least one monohydric alcohol and at least one water-soluble polar organic coalescing solvent, to provide a single liquid phase propellant-solvent solution in which the film-forming polymer is dissolved. Since the propellant-solvent solution is provided as a single liquid phase, the film-forming polymer is uniformly distributed therein and, therefore, can be uniformly dispensed from the container in which the composition is located. The composition is non-flammable and exhibits no toxicity.

The film-forming polymer which is used in this invention is a drying oil-modified ester polymer, which permits the polymer to rapidly dry and form a water-resistant and -insensitive film on the substrate surface. A wide variety of drying oil-modified ester polymers may be used, although oil-modified alkyd resins are preferred. The present invention does not use the complex and water sensitive acrylic resins of the prior art of the Japanese patent publication referred to above.

GENERAL DESCRIPTION OF INVENTION AND DESCRIPTION OF PREFERRED EMBODIMENTS

Dimethyl ether is a colorless, odorless, stable polar liquid with a boiling point of $-25°$ C. and a vapor pressure of 4.2 bar at $20°$ C. In the present invention, dimethyl ether is used in a combination with water, and at least one water-soluble polar organic solvent, preferably a mixture of an alcohol and a water-soluble organic coalescing solvent, to provide a single phase propellant-solvent solution for a water-solubilized oil-modified ester polymer. The present invention involves a different application of the dimethyl ether in different proportions for a different purpose when compared with the prior art.

The dimethyl ether constitutes about 20 to about 60% by weight of the aerosol paint composition of the invention, preferably about 20 to about 40% by weight, typically about 40% by weight.

A gaseous phase propellant, such as, nitrogen, carbon dioxide or nitrous oxide, may be used to enhance the propellant effect of the dimethyl ether, if desired. However, the composition usually exerts a vapor pressure in a pressurized aerosol container in the range of about 30 to about 85 psig, preferably about 40 to about 60 psig, at $70°$ F.

Another essential component of the paint composition of the invention is water. This component is present in a concentration of about 20 to about 40% by weight, preferably about 20 to about 35% by weight, typically about 30% by weight.

In a preferred embodiment of the invention, a water-soluble lower aliphatic monohydric alcohol also is used in the composition. The monohydric alcohols used in this invention are those having the formula R-OH wherein R is an unsubstituted straight or branched chain alkyl group containing from 1 to 6 carbon atoms. Examples of suitable monohydric alcohols are methanol, ethanol, n-propanol, iso-propanol and n-butanol, preferably ethanol or isopropanol.

The concentration of the monohydric alcohol used in the compositions of this invention may vary widely from about 1 to about 20% by weight, preferably about 5 to about 20% by weight, typically about 15% by weight.

In a preferred embodiment of the invention, a water-soluble organic coalescing solvent is present along with the alcohol. A coalescing organic solvent is one which assists in film formation and which acts as an agent to provide a single phase solution.

The coalescing solvent may be any water-soluble polar organic solvent. Such materials include glycol ethers, esters, ketones and certain modified alcohols and may have a boiling point in the range of about $365°$ to about $572°$ F. (about $185°$ to about $300°$ C.). Suitable solvents include lower monoalkyl ethers of ethylene or propylene glycol, such as, propylene glycol methyl ether and propylene glycol methyl ethyl ether, diacetone alcohol and ester alcohols.

The coalescing solvent is present in an amount of from about 1 to about 10% by weight, preferably about 5 to about 10% by weight, typically about 6% by weight. The combination of the monohydric alcohol and coalescing solvent is present in an amount of about 2 to about 30% by weight and, in combination with the chosen proportions of dimethyl ether and water, forms a single phase composition which is suitable for dissolving or suspending the active components to be dispensed.

In many instances, both an alcohol and a coalescing solvent are required. However, certain resins providing the film-forming component of the composition may be utilized when one or the other of these components is absent.

In the broadest aspect of the invention, therefore, the composition contains at least one water-soluble polar organic solvent in a concentration from about 0.1 to about 45% by weight.

The dimethyl ether constitutes the main propellant component of the composition. The water provides the primary solvent phase for the film-forming polymer.

The water-soluble organic solvents mainly act as solvents for the propellant and the water, so that there results a single liquid phase solution of components, which resists separation into separate liquid phases on standing. A single phase propellant-solvent solution enables a film-forming polymer dissolved therein to be readily and efficiently dispensed from the aerosol container.

In the water-based aerosol paint compositions of the invention, the film-forming polymer comprises about 6 to about 25% by weight, preferably about 12 to about 20% by weight, of the composition and about 92 to about 75% by weight, preferably about 88 to about 80% by weight, of single liquid phase propellant-solvent solution and, optional components, such as, pigments, surfactants, stabilizers, antifoam agents and plasticizers, as discussed in more detail below.

The propellant-solvent solution in which the film-forming polymer is dissolved is quite versatile and is effective to permit the spray application of a wide variety of water-solubilized oil-modified film-forming ester polymers onto a substrate surface to form a continuous film of excellent durability, including high flexibility retention. Depending on the nature of the polymer and the other components of the formulation, the films may be of high gloss, medium gloss, low gloss or flat.

Aerosol compositions formulated using the propellant-active carrier system of the composition are substantially non-flammable, as tested according to standard flammability tests for aerosols. For example, the spray blows out a candle.

The film-forming polymers which are used in the compositions of the invention are drying oil-modified ester polymers which are solubilized to dissolve in the single liquid phase propellant-solvent solution provided by the dimethyl ether, water and at least one water-soluble polar solvent. Solubilization usually is achieved by neutralization of the acid component of the resin by a volatile base, usually ammonia and/or an amine, such as, dimethylamine, diethylamine, diethanolamine, or triethanolamine. Upon spraying the polymer from the aerosol container onto the substrate surface, volatilization of the base occurs and the polymer air drys to a water-resistant film.

Ester polymers which may be provided in an oil-modified form for use in the present invention include acrylic esters, alkyd esters and epoxy esters. Further modification of the structure of the resin may be achieved by the substitution of various monomers for a portion of the ester-forming monomers.

Ester polymers are formed by reaction of hydroxy groups on one component with carboxy groups on another component, either to form long chains, as in the case of alkyd resins, or to form ester monomers which can be polymerized to long polymeric chains, as in the case of acrylic resins.

Alkyd resins are formed by combining polybasic acids or their anhydrides, usually phthalic anhydride, with a polyhydric alcohol, such as, glycerol. Modifications of the alkyd resin by other monomers, such as acrylic acid, may be effected by substituting acrylic acid for a portion of the polybasic acid. Acrylic ester resins are formed by polymerization of the ethylenic unsaturation of monomer esters of acrylic acid or methacrylic acid. Acrylic esters may be modified by copolymerizing other ethylenically-unsaturated monomers therewith, such as, styrene.

Epoxy ester resins are resins containing a reactive epoxy group and are derived from polyols and epoxy-group containing compounds and may have other co-monomers polymerized therewith, such as, styrene.

Oil modification of ester polymers is achieved by substitution of a natural or synthetic vegetable oil fatty acid for the mono-or poly-basic acid taking part in the esterification reaction. For example, for oil modification of alkyd resins, the polybasic acid is substituted in part by the vegetable oil fatty acid. The presence of the vegetable oil fatty acid imparts a drying capability to the polymer enabling it to rapidly form a hard, tough, elastic, water-resistant polymer film, especially in the presence of drying accelerators.

Examples of natural drying oils which may be used for drying oil modification of the ester polymers are linseed oil, soyabean oil and safflower oil. In some cases, chemically-modified forms of the drying oils themselves may be used.

The proportion of oil modification of the ester polymer, i.e., substitution for carboxylic acid component, may vary considerably and for alkyd resins typically about 30 to about 60% by weight.

A wide variety of water-reducible oil-modified ester polymers are available in the marketplace and any of these commercial products is suitable for use as the polymer component of the water-based aerosol paint compositions of the invention. Examples of commercial products which may be used in the present invention include those oil-modified alkyd resins sold under the trademarks or tradenames "Arolon 580" and "Arolon 585" by Ashland Chemical Company, "Z-2055-M" by Cook Paints and Varnishes, "7407", "7456" and "7462" by Cargill Chemical Products, "Beckosol 92-100" by Reichhold Chemicals Inc., "ZZM-23" and "S-1349" by Midwest Synthetics, "RL-2312-74" by Reliance, "Aquamac 1091" by McWhorter Resins, and "Kelsol 3920", "Kelsol 3921" and "Kelsol 3960" by Spencer Kellogg division of Textron Inc.

Representative examples of commercially-available modified alkyd resins which may be used in the present invention are those acrylated oil-modified alkyd resins sold under the trademarks or tradenames "B-1537-M" by Cook Paints and Varnishes, "7419" by Cargill Chemical Products, "WR-4005-BC-70" by Reliance, and "Aquamae 1100" by McWhorter Resins, the styrenated oil-modified alkyd resins sold under the trademark or tradename "7423" by Cargill Chemical Products, the silicone-modified oil-modified alkyd resin sold under the trademark or tradename "Kelsol 3970-94-75" by Spencer Kellogg division of Textron Inc. and the urethane-modified oil-modified alkyd resins sold under the trademarks or tradenames "Spensol F72" by Spencer Kellogg division of Textron Inc. and "Aquamae 1200" by McWhorter Resins.

As mentioned above, oil-modified acrylic acid esters also may be used as the film-forming polymer of the invention. Examples of suitable commercially-available oil-modified acrylics include those sold under the trademarks or tradenames "Acrysol WS-24", "Acrysol WS-32", "Acryloid WS-50" and "Acryloid WR-748" by Rohm and Haas Company, "Carboset 514H" by B. F. Goodrich Chemical Company and "90-587 Synthemul" by Reichhold Chemicals Limited.

Other commercially-available materials which may be used in this invention include the oil-modified epoxy ester sold under the trademark or tradename "38-690 Epotuf" by Reichhold Chemicals Limited, and the styrenated oil-modified epoxy esters sold under the trademarks or tradenames "B-453-V8" and "B-453-M" by Cook Plastics and Varnishes.

In certain instances waterborne chemically-modified drying oils may be used for formulating stains and wood preservatives in this invention. An example of a commercially-available material is the water-dispersible linseed oil polymer sold under the trademark or tradename "Kelsol 3931" by Spencer Kellogg division of Textron Inc.

An optional component which may be present in the paint composition is a pigment for pigmentation of the film formed on spraying the composition onto a substrate surface. When employed, up to about 15% by weight of the total composition of the pigment may be used, preferably about 5 to about 15% by weight of pigment.

When such pigment is present, the quantity of polymer used is generally towards the lower end of the range recited above. When such pigment is omitted and a clear film is required, then quantities of polymer towards the higher end of the range are used.

The presence of the pigment usually requires the presence of added surfactant to ensure suspension of the pigment in the liquid vehicle. The overall quantity of surfactant present in the composition should be sufficient to maintain solids in suspension and usually varies up to about 3% by weight of the composition.

A pH stabilizer usually is also present in the composition to provide an overall pH value greater than about 7.2 and up to about 10 to assist in inhibition of corrosion of the conventional pressurized metal container in which the paint composition is located for spray application. The pH stabilizer usually is provided by the component solubilizing the oil-modified polymer. Suitable pH stabilizer materials include morpholine, ammonia, triethanolamine, and other amines. This component may be present in an amount of up to about 2% by weight of the total composition.

An antifoam agent may be included to alter the surface tension of the composition to permit ready release of dissolved gases upon spraying of the composition onto the substrate surface and to counteract the detergent effect of any surfactants present in the composition. A non-ionic blend of mineral oils and silica derivatives has been found to be suitable for use for defoaming. When an antifoam agent is present, quantities up to about 2% by weight of the total composition may be used, preferably about 0.4% by weight.

Another component which may be added to the aerosol paint composition is a plasticizer to promote flexibility of the polymer film. Any one of a wide range of plasticizers may be used, for example, dioctyl phthalate. The plasticizer may be present in an amount of up to about 2% by weight of the total composition, preferably about 1% by weight.

Small quantities of driers also may be present in the composition to accelerate drying of the film-forming polymer once it is spray applied to the substrate surface. Driers usually comprise metallic compositions, such as, cobalt and manganese naphthenates. The drier materials may be present in an amount of up to about 0.5% by weight of the total composition, preferably about 0.05 to about 0.3% by weight.

The aerosol water-based paint composition, which is formulated as described above, may be sprayed onto a substrate surface without foaming occurring and the pigmented or unpigmented continuous film touch dries rapidly, usually in about 15 to 30 minutes, and exhibits complete water resistance in an acceptable period of time, usually in about 3 to 5 hours.

EXAMPLES

Examples 1 to 8

A number of aerosol water-based paint formulations were prepared from various oil-modified polymers solubilized with ammonia or an amine and packaged in aerosol containers. The films were sprayed onto substrate surfaces and, in each case, a continuous film was formed which may dry to the touch in 30 minutes, exhibited water resistance within three hours of application and had a salt spray resistance (ASTM test B117) of more than 50 hours.

In each case, the dimethyl ether, water and polar organic solvent(s) formed a single liquid phase solution in which the solubilized oil-modified polymer was dissolved and the remainder of the components were dissolved or suspended. In each case, the single liquid phase solution had a pH of about 7.4 to about 7.9.

The following are the formulations which were tested:

EXAMPLE 1

This Example illustrates a red oxide primer paint composition based on an oil-modified epoxy resin:

| Component | Wt. % |
| --- | --- |
| 38-690 Epotuf[1] resin | 18.1 |
| Water | 13.25 |
| Isopropyl alcohol | 15.0 |
| Butylcellosolve | 4.0 |
| Texanol | 0.7 |
| Red oxide pigment | 5.0 |
| Driers-Mn 6%, Co 6% | 0.25 |
| L 475[2] | 0.2 |
| Triethanolamine | 1.0 |
| Dioctyl phthalate | 0.5 |
| OK 412[3] | 2.0 |
| Dimethyl ether | 40.0 |
| Total | 100.0 |

Notes:
[1] 38-690 Epotuf is a water-solubilizable oil-modified epoxy ester resin manufactured by Reichhold Chemicals Limited. Triethanolamine is used as the solubilizing agent.
[2] Defoamer manufactured by Dow Chemical.
[3] Silica flattening agent.

EXAMPLE 2

This Example illustrates a fire orange fluorescent high gloss paint composition based on an oil-modified acrylic resin.

| Component | Wt. % |
| --- | --- |
| 90-587 Synthemul resin[1] | 15.0 |
| Water | 22.7 |
| Isopropyl alcohol | 15.0 |
| Butylcellosolve | 4.0 |
| Fire orange pigment | 11.7 |
| L475 | 0.2 |
| NH4OH (conc.) | 1.3 |
| Triton X 405[2] | 0.1 |
| Dimethyl ether | 30.0 |
| Total | 100.0 |

Notes:
[1] 90-587 Synthemul resin is a water solubilizable oil-modified acrylic resin manufactured by Reichhold Chemicals Limited. Ammonia is used as the solubilizing agent. This resin is known to be thermosetting but, in this Example, the resin was allowed to air dry and was not thermoset.
[2] Non-ionic surfactant manufactured by Rohm & Haas.

EXAMPLE 3

This Example illustrates a blue high gloss paint composition based on oil-modified alkyd resins.

| Component | Wt. % |
|---|---|
| Arolon 580 resin[1] | 17.0 |
| Arolon 585 resin[2] | 10.2 |
| Water | 18.8 |
| Isopropyl alcohol | 7.7 |
| Butylcellosolve | 2.3 |
| Blue pigment | 2.1 |
| White pigment | 1.1 |
| Drier (Co) | 0.3 |
| L475 | 0.2 |
| NH$_4$OH (5%) | 0.1 |
| Triton X-100 | 0.3 |
| Dimethyl ether | 40.0 |
| Total | 100.0 |

Notes:
[1]Arolon 580 resin is a water-dispersible oil-modified resin manufactured by Ashland Chemical Company.
[2]Arolon 585 resin is a water-dispersible oil-modified alkyd resin manufactured by Ashland Chemical Company.

EXAMPLE 4

This Example illustrates a white high gloss paint composition based on an oil-modified epoxy resin.

| Component | Wt. % |
|---|---|
| B-453-V8 resin[1] | 13.0 |
| Water | 31.0 |
| White tinter[2] | 13.5 |
| Driers - 6% Co, 6% Mn | 0.2 |
| Active 8[3] | 0.1 |
| NH$_4$OH (conc.) | 1.0 |
| Byk 020[4] | 0.2 |
| Byk 351[5] | 1.0 |
| Dimethyl ether | 40.0 |
| Total | 100.0 |

Notes:
[1]B-453-V8 resin is a water solubilizable styrenated oil-modified epoxy resin manufactured by Cook Paints and Varnishes Inc. Ammonia is used as the solubilizing agent.
[2]The tinter comprises (wt. %)
B-453-V8 resin  23.5
NH$_4$OH (conc.)  1.5
Water  15.0
TiO$_2$  65.0
Total  100.0
[3]Dry promotor
[4]Defoamer
[5]Flow agent

EXAMPLE 5

This Example illustrates a walnut wood composition based on chemically-modified linseed oil.

| Component | Wt. % |
|---|---|
| Kelsol 3931 resin[1] | 24.00 |
| Water | 18.51 |
| Isopropanol | 3.94 |
| Butyl cellosolve | 6.00 |
| Propasol P[2] | 6.00 |
| Tamol 731[3] | 0.14 |
| Clearate WD[4] | 0.32 |
| Ammonia 28° B | 0.36 |
| OK10[5] | 0.21 |
| Active 8 | 0.18 |
| Yellow oxide pigment | 0.07 |
| Red oxide pigment | 0.12 |
| Carbon black pigment | 0.15 |
| Dimethyl ether | 40.00 |
| Total | 100.00 |

Notes:
[1]Kelsol 3931 resin is a waterborne chemically-modified linseed oil manufactured by Spencer Kellogg.
[2]A glycol ether manufactured by Union Carbide Corporation.
[3]Polymeric dispersant manufactured by Rohm & Haas.
[4]Water dispersible soya lecithin.
[5]Drier.

EXAMPLE 6

This Example illustrates a green enamel paint composition based on an oil-modified alkyd resin.

| Component | Wt. % |
|---|---|
| B-1537-M resin[1] | 13.20 |
| Water | 33.08 |
| Isopropanol | 4.94 |
| Butyl cellosolve | 2.40 |
| Methyl cellulose | 0.03 |
| Ammonia 26° B | 0.36 |
| Triethanolamine | 0.42 |
| Raybo 85[2] | 0.12 |
| Clearate WD | 0.18 |
| Blue tinter | 1.88 |
| Yellow tinter | 2.26 |
| White tinter | 0.36 |
| Carbon black tinter | 0.20 |
| OK10 drier | 0.09 |
| Byk 020 | 0.18 |
| Dimethyl ether | 40.00 |
| Total | 100.00 |

Notes:
[1]B-1537-M resin is a water-solubilizable acrylic-modified, oil-modified alkyd resin manufactured by Cook Paints and Varnishes. Ammonia and triethanolamine are used to achieve solubilization.
[2]Antioxidant manufactured by Raybo Inc.

EXAMPLE 7

This Example illustrates a red enamel paint composition based on the same oil-modified alkyd resin as used in Example 6.

| Component | Wt. % |
|---|---|
| B-1537-M resin | 15.00 |
| Water | 26.76 |
| Isopropanol | 3.90 |
| Butanol | 3.90 |
| Butylcellosolve | 1.20 |
| Ammonia 26° B | 0.36 |
| Triethanolamine | 0.42 |
| Clearate WD | 0.18 |
| Raybo 85 | 0.12 |
| Titanium dioxide dispersion | 1.80 |
| Red dispersion | 5.76 |
| OK10 drier | 0.33 |
| Active 8 | 0.09 |
| Byk 020 | 0.18 |
| Dimethyl ether | 40.00 |
| Total | 100.00 |

EXAMPLE 8

This Example illustrates a flat black paint composition suitable for the provision of a heat resistant coating and based on an oil-modified alkyd resin.

| Component | Wt. % |
|---|---|
| Kelsol 3970-94-75 resin[1] | 11.64 |
| Water | 25.29 |

-continued

| Component | Wt. % |
| --- | --- |
| Isopropanol | 1.13 |
| Butanol | 4.44 |
| Butylcellosolve | 4.23 |
| Ammonia 26° B | 0.78 |
| Pyrogenic silica | 3.36 |
| Clearate WD | 0.27 |
| Raybo 85 | 0.12 |
| Carbon black and iron black dispersion | 8.29 |
| OK10 drier | 0.30 |
| Active 8 | 0.03 |
| Byk 020 | 0.12 |
| Dimethyl ether | 40.00 |
| Total | 100.00 |

Note:
(1)Kelsol 3970-94-75 resin is water-solubilizable, silicone-modified, oil-mosified alkyd resin manufactured by Spencer Kellogg. The resin is solubilized by the ammonia.

SUMMARY OF DISCLOSURE

In summary of this disclosure, the present invention, therefore, provides a novel aerosol water-based paint composition which can be spray applied onto substrate surfaces, which is non-flammable and non-toxic, and is applied from a solution of film-forming polymer in propellant-solvent components. Modifications are possible within the scope of this invention.

What I claim is:

1. An aerosol water-based paint composition suitable for spray application to a substrate surface and air drying to a continuous durable film thereon, comprising:
   (a) about 6 to about 25 wt. % of at least one film-forming polymer which is a drying oil-modified ester polymer which is rendered water soluble by neutralization with a volatile base and which is capable of air drying to a water-resistant coating film upon volatilization of said volatile base after spraying the polymer onto a substrate surface,
   (b) about 20 to about 60 wt. % of dimethyl ether,
   (c) about 20 to about 40 wt. % of water,
   (d) about 0.1 to about 30 wt. % of at least one water-soluble polar organic solvent,
   (e) 0 to about 3 wt. % of at least one surfactant,
   (f) 0 to about 15 wt. % of at least one pigment,
   (g) 0 to about 1 wt. % of at least one pH stabilizer,
   (h) 0 to about 2 wt. % of at least one antifoam agent,
   (i) 0 to about 2 wt. % of at least one plasticizer, and
   (j) 0 to about 0.5 wt. % of at least one drier for said film-forming polymer,
   said dimethyl ether, water, and at least one polar organic solvent being present in proportions to provide a single liquid phase propellant-active carrier solution having a pH of about 7.2 to about 10 and in which said film-forming polymer is dissolved and the remainder of the components of the composition are dissolved or suspended.

2. The composition of claim 1 wherein said polar organic solvent is at least one aliphatic monohydric alcohol of the formula R-OH, in which R is an unsubstituted straight or branched chain alkyl group containing from 1 to 6 carbon atoms.

3. The composition of claim 1 wherein said polar organic solvent is selected from the group consisting of lower monoalkyl esters of ethylene or propylene glycol, diacetone alcohol, ketones and ester alcohols.

4. The composition of claim 1 wherein said polar organic solvent is a mixture of at least one aliphatic monohydric alcohol of the formula R-OH in which R is an unsubstituted straight or branched chain alkyl group containing from 1 to 6 carbon atoms and a different water-soluble polar organic solvent.

5. An aerosol water-based paint composition suitable for spray application to a substrate surface and air drying to a continuous film thereon, comprising:
   (a) about 6 to about 25 wt. % of at least one film-forming polymer which is a drying oil-modified ester polymer which is rendered water soluble by neutralization with ammonia or an amine and which is capable of air drying to a water-resistant coating film upon volatilization of said ammonia or amine after spraying the polymer onto a substrate surface,
   (b) about 20 to about 60 wt. % of dimethyl ether,
   (c) about 20 to about 40 wt. % of water,
   (d) about 1 to about 20 wt. % of at least one aliphatic monohydric alcohol of the formula R-OH wherein R is an unsubstituted straight or branched chain alkyl group containing from 1 to 6 carbon atoms,
   (e) about 1 to about 10 wt. % of at least one water soluble polar organic coalescing solvent,
   (f) 0 to about 3 wt. % of at least one surfactant,
   (g) 0 to about 15 wt. % of at least one pigment,
   (h) 0 to about 1 wt. % of at least one pH stabilizer,
   (i) 0 to about 2 wt. % of at least one antifoam agent,
   (j) 0 to about 2 wt. % of at least one plasticizer, and,
   (k) 0 to about 0.5 wt. % of at least one drier for said film-forming polymer,
   said dimethyl ether, water, at least one monohydric alcohol and at least one polar organic coalescing solvent being present in proportions to provide a single liquid phase propellant-active carrier solution having a pH of about 7.2 to about 10 and in which said film-forming polymer is dissolved and the remainder of the components of the composition are dissolved or suspended.

6. The composition of claim 5 wherein said dimethyl ether is present in an amount from about 20 about 40% by weight.

7. The composition of claim 5 wherein said water is present in an amount of about 20 to about 35% by weight.

8. The composition of claim 5 wherein said monohydric alcohol is present in an amount of about 5 to about 20% by weight.

9. The composition of claim 5 wherein said coalescing solvent is present in an amount of about 5 to about 10% by weight.

10. The composition of claim 5 wherein said dimethyl ether is present in an amount of about 20 to about 40% by weight, said water is present in an amount of about 20 to about 35% by weight, said monohydric alcohol is present in amount of about 5 to about 20% by weight, and said coalescing solvent is present in an amount of about 5 to about 10% by weight.

11. The composition of claim 10 wherein said monohydric alcohol is ethanol or isopropanol.

12. The composition of claim 5 wherein said pH is about 7.4 to about 7.9.

13. The composition of claim 5 wherein said continuous film is pigmented and said at least one pigment is present in said composition in an amount of about 5 to about 15% by weight.

14. The composition of claim 1 wherein said film-forming polymer is an oil-modified alkyd resin.

15. The composition of claim 5 wherein said film-forming polymer is an oil-modified alkyd resin.

* * * * *